United States Patent
Hohle et al.

(10) Patent No.: US 8,690,539 B2
(45) Date of Patent: Apr. 8, 2014

(54) BORON-BASED REFRACTORY COATING FOR A WIND TURBINE COMPONENT

(75) Inventors: Andreas Christian Hohle, Alsdorf (DE); Christian Hohmann, Mülheim an der Ruhr (DE); Claudia Kummer, Aachen (DE); Helmut Kölpin, Baesweiler (DE); Ying Li, Aachen (DE); Brice Tchemtchoua, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 12/987,629

(22) Filed: Jan. 10, 2011

(65) Prior Publication Data

US 2011/0171028 A1    Jul. 14, 2011

(30) Foreign Application Priority Data

Jan. 14, 2010 (DE) .................. 10 2010 004 662

(51) Int. Cl.
  *F03D 11/00* (2006.01)
(52) U.S. Cl.
  USPC .................. 416/169 R; 416/241 B
(58) Field of Classification Search
  USPC ............ 415/2.1–4.5, 200; 416/169 R, 170 R, 416/223 R, 241 R, 241 B, 241 A
  See application file for complete search history.

(56) References Cited

U.S. PATENT DOCUMENTS

| | | | | |
|---|---|---|---|---|
| 4,492,522 A * | 1/1985 | Rossmann et al. | ........ | 416/241 R |
| 7,547,985 B2 * | 6/2009 | Takaichi et al. | ................ | 290/55 |
| 7,604,461 B2 | 10/2009 | Bonnet | | |
| 8,091,227 B2 * | 1/2012 | Hong | ........................... | 29/889.1 |
| 8,247,085 B2 * | 8/2012 | Bewlay et al. | ................ | 428/662 |
| 2005/0208218 A1 * | 9/2005 | Becker et al. | .............. | 427/248.1 |
| 2007/0031639 A1 | 2/2007 | Hsu et al. | | |
| 2007/0197407 A1 | 8/2007 | Scott | | |
| 2010/0171317 A1 * | 7/2010 | Trede | ............. | 290/55 |
| 2011/0246094 A1 * | 10/2011 | Olesen | ........................... | 702/34 |
| 2012/0245253 A1 * | 9/2012 | Schultz et al. | ................ | 523/435 |

FOREIGN PATENT DOCUMENTS

| | | |
|---|---|---|
| CN | 2720184 Y | 8/2005 |
| CN | 1673408 A | 9/2005 |
| CN | 101275535 A | 10/2008 |
| CN | 102128143 A | 7/2011 |
| DE | 10309383 A1 | 9/2003 |
| DE | 102007014861 A1 | 10/2008 |
| EP | 1302685 A1 | 4/2003 |
| EP | 1935509 A1 | 6/2008 |
| EP | 2189672 A2 | 5/2010 |
| JP | 10-148102 A * | 6/1998 |
| WO | WO 2007075497 A2 | 7/2007 |

OTHER PUBLICATIONS

Ikeda, Turbine nozzle and boride covering method therefor, Jun. 2, 1998, Abstract of JP10-148102A.*

* cited by examiner

*Primary Examiner* — Edward Look
*Assistant Examiner* — Liam McDowell

(57) ABSTRACT

A wind turbine including at least one component with a surface is provided. The surface is coated at least in part with a refractory layer, preferably a boron-based refractory layer. Further, a wind farm including such a wind turbine and a method are provided.

11 Claims, 1 Drawing Sheet

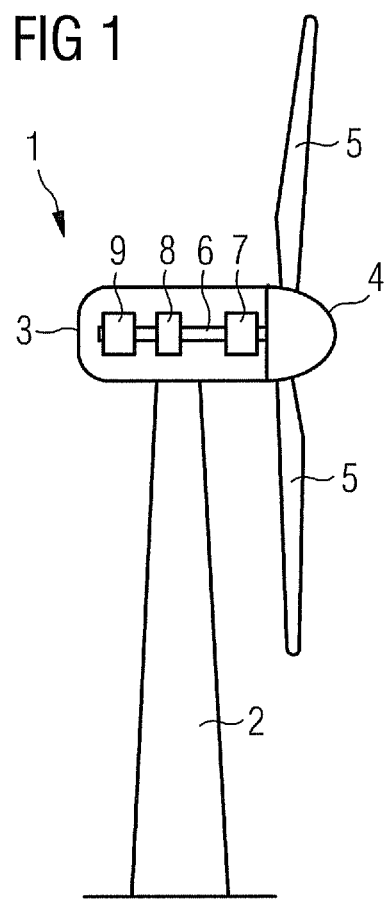
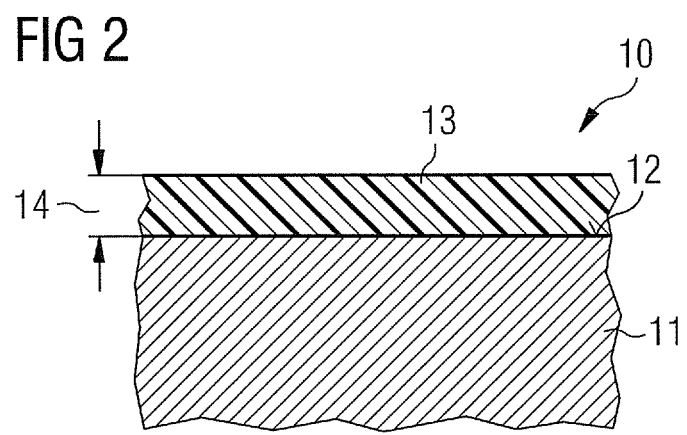

BORON-BASED REFRACTORY COATING FOR A WIND TURBINE COMPONENT

CROSS REFERENCE TO RELATED APPLICATIONS

This application claims priority of German Patent Application No. 10 2010 004 662.0 DE filed Jan. 14, 2010, which is incorporated by reference herein in its entirety.

FIELD OF INVENTION

The present invention relates to a wind turbine, a wind faint and a method for improving a property of a surface of a component of a wind turbine.

BACKGROUND OF INVENTION

In order to ensure wind turbine systems provide trouble-free operation through to the end of their expected service life it is necessary to reduce wear and tear on the mechanical components installed therein. At the same time it is important from the point of view of their cost-effectiveness to improve the operating efficiency of such installations.

Thermal hardening/curing techniques and modified lubricants are employed in prior art wind turbines in order to minimize wear and tear, in particular on the mechanical components, or in order to improve efficiency.

SUMMARY OF INVENTION

It is a first object of the present invention to provide an advantageous wind turbine. A second object of the present invention is to provide an advantageous wind faun. Furthermore, a third object of the invention is to provide an advantageous method for improving a property of a surface of a component of a wind turbine.

The first object is achieved by means of a wind turbine; the second object is achieved by a wind farm; the third object is achieved by a method for improving a property of a surface of a component of a wind turbine as claimed in the independent claims. The dependent claims contain further advantageous embodiments of the invention.

The wind turbine according to the invention comprises at least one component having a surface. The surface is coated at least in part with a refractory layer. The component can be in particular a mechanical component. Refractory layers simultaneously offer high potential not only for minimizing wear and tear but also for increasing the level of efficiency of parts that move relative to one another. In the context of the present invention a mechanical component can be understood to mean in particular a component that has a mechanical function or is exposed to mechanical stress.

Advantageously, the surface can be coated at least in part with a boron-based refractory layer. In addition to the general advantages of refractory layers, boron-based refractory layers have self-lubricating properties. The antifriction performance of the respective component is significantly improved thanks to the self-lubricating properties of the boron-based refractory layer. Furthermore, the failure behavior of the respective component is also improved. Moreover, boron reacts with free water to form boric acid, which acts as a lubricant and reduces or eliminates the occurrence of free water in the lubricant.

The boron-based refractory layer can include in particular boride. As already mentioned above, the coating has self-lubricating properties.

The surface of the component can also include steel or be made of steel. The surface of the steel can be coated at least in part with a refractory layer, preferably with a boron-based refractory layer. The steel can be hardened or unhardened steel.

The component of the wind turbine can be, for example, a tower, a nacelle, a rotor, a rotor hub, a rotor blade, a gear mechanism, an element of a gear mechanism, a brake, a rotational axis or an element of a generator, in particular a mechanical element of a generator.

The refractory layer can have a layer thickness of between 10 nm and 1000 µm, advantageously of between 10 nm and 10 µm or between 100 µm and 1000 µm. The surface of the component according to the invention can be coated either only partially or else completely with a refractory layer.

For example, the surface can consist of unhardened steel and a boron-rich substance can be applied to the surface. A heat treatment process can then be performed. With this method a layer having a layer thickness of several 100 µm, for example of between 100 µm and 1000 µm, can be produced. Alternatively thereto, the surface can consist of hardened steel and be coated by means of physical vapor deposition. With this method a layer having a thickness of between 10 nm and 10 µm can be produced.

In principle the refractory coating, in particular the boron-based refractory layer, can also act as corrosion protection for the respective component.

The wind farm according to the invention comprises at least one wind turbine according to the invention. The wind farm has the same characteristics and advantages as the above-described wind turbine according to the invention. In this respect the reader is referred to the statements made in connection with the wind turbine according to the invention.

The method according to the invention for improving a property of a component of a wind turbine is characterized in that the surface is coated at least in part with a refractory material. The component can preferably be a mechanical component. Advantageously, the surface can be coated at least in part with a boron-based refractory material. With regard to the advantages of refractory layers, and of boron-based refractory layers in particular, the reader is referred to the statements made above in connection with the wind turbine according to the invention. Preferably the surface can be coated with boride.

With the aid of the method according to the invention it is possible, for example, to increase efficiency and/or resistance to wear and tear, in particular of impact surfaces or bearing surfaces. In addition to minimizing wear and tear and increasing efficiency, the implemented coating can also serve as corrosion protection.

Within the scope of the method according to the invention, the surface of the component can be coated either only partially or else completely with a refractory material. For example, the surface can be coated by boronizing or by physical vapor deposition (PVD). With boronizing, in particular a boron-rich substance can initially be applied to a surface. A heat treatment process can subsequently be performed.

The surface can also include steel. The steel can be hardened or unhardened steel. The refractory material can be applied at least in part to the steel.

Preferably the surface can be coated at least in part with a refractory material, in particular a boron-based refractory material, having a layer thickness of between 10 nm and 1000 µm. In the case of physical vapor deposition the surface can advantageously be coated with a layer having a thickness of between 10 nm and 10 µm, and in the case of boronizing, with a layer having a thickness of between 100 µm and 1000 µm.

BRIEF DESCRIPTION OF THE DRAWINGS

Further features, characteristics and advantages of the present invention are explained in more detail below on the basis of an exemplary embodiment and with reference to the attached figures, in which:

FIG. 1 schematically shows a wind turbine.

FIG. 2 schematically shows a section through part of a component of a wind turbine.

DETAILED DESCRIPTION OF INVENTION

An exemplary embodiment of the invention is explained in more detail below with reference to FIGS. 1 and 2. FIG. 1 schematically shows a wind turbine 1. The wind turbine 1 comprises a tower 2, a nacelle 3 and a rotor hub 4. The nacelle 3 is arranged on the tower 2. The rotatably mounted rotor hub 4 is arranged on the nacelle 3. At least one rotor blade 5 is fixedly attached to the rotor hub 4.

The wind turbine 1 additionally comprises at least one rotational axis 6, a gear mechanism 7, a brake 8 and a generator 9. The rotational axis 6, the gear mechanism 7, the brake 8 and the generator 9 are arranged in the interior of the nacelle 3. An axis center distance is possible in principle in the gear mechanism 7. Different components can therefore have different rotational axes.

FIG. 2 schematically shows a section through part of a mechanical component 10 of the wind turbine 1. The mechanical component 10 can be, for example, the tower 2, the nacelle 3, the rotor hub 4, the rotor blade 5, the gear mechanism 7, the brake 8, the rotational axis 6 or the generator 9. The mechanical component 10 can also be an element of the aforementioned components.

In the present exemplary embodiment the mechanical component 10 is made of hardened or unhardened steel 11. The steel 11 has a surface 12 which is coated with a refractory layer 13. Preferably the refractory layer is a boron-based refractory layer.

In the case of hardened steel the refractory layer can be applied to the surface 12 of the steel 11 with the aid of physical vapor deposition, for example. The refractory layer 13 has a layer thickness 14 of between 10 nm and 100 μm. Preferably the refractory layer is a maximum of several μm, in particular a maximum of 10 μm, thick.

In the case of unhardened steel the boron-based refractory layer can be applied to the surface 12 of the steel 11 by boronizing, for example. In this process a boron-rich substance is initially applied to the surface 12 and subsequently subjected to heat treatment. In this case the refractory layer 13 has a layer thickness 14 of between 100 μm and 1000 μm.

The invention claimed is:

1. A wind turbine, comprising:
a wind turbine component with a surface,
wherein the surface is coated at least in part with a boron-based refractory layer,
wherein the boron-based refractory layer has a layer thickness between 10 nm and 10 μm effective to provide a degree of erosion resistance or lubrication to the surface.

2. The wind turbine as claimed in claim 1,
wherein the boron-based refractory layer includes boride.

3. The wind turbine as claimed in claim 1,
wherein the surface of the component includes steel, a surface of the steel being coated at least in part with the refractory layer.

4. The wind turbine as claimed in claim 1,
wherein the component is a tower, a nacelle, a rotor, a rotor hub, a rotor blade, a gear mechanism, an element of a gear mechanism, a brake, a rotational axis or an element of a generator.

5. A wind farm, comprising:
a wind turbine, the wind turbine comprising
a component with a surface,
wherein the surface is coated at least in part with a boron-based refractory layer, wherein the boron-based refractory layer has a layer thickness between 10 nm and 10 μm effective to provide a degree of erosion resistance or lubrication to the surface.

6. The wind farm as claimed in claim 5,
wherein the boron-based refractory layer includes boride.

7. The wind farm as claimed in claim 5,
wherein the surface of the component includes steel, a surface of the steel being coated at least in part with the refractory layer.

8. A method for improving a property of a surface of a component of a wind turbine, comprising:
coating the surface at least in part with a boron-based refractory material,
wherein the boron-based refractory material has a layer thickness between 10 nm and 10 μm effective to provide a degree of erosion resistance or lubrication to the surface.

9. The method as claimed in claim 8,
wherein the surface is coated with boride.

10. The method as claimed in claim 8,
wherein the surface is coated by physical vapor deposition.

11. The method as claimed in claim 8,
wherein the surface includes steel and the refractory material is applied at least in part to the steel.

* * * * *